May 28, 1940.                    R. LEVY                    2,202,458
DEVICE FOR REPRODUCING CINEMATOGRAPHIC IMAGE RECORDS
Filed Sept. 22, 1936          2 Sheets-Sheet 1
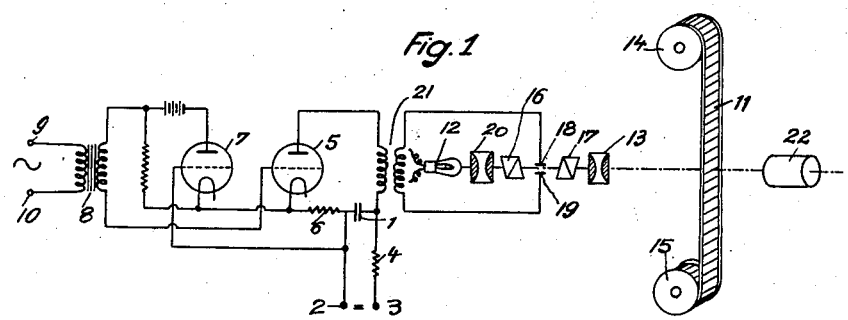
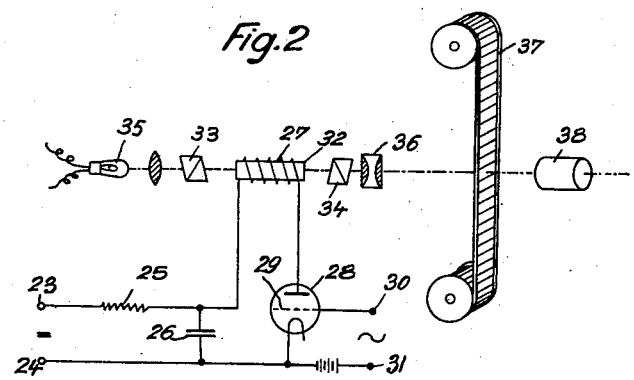
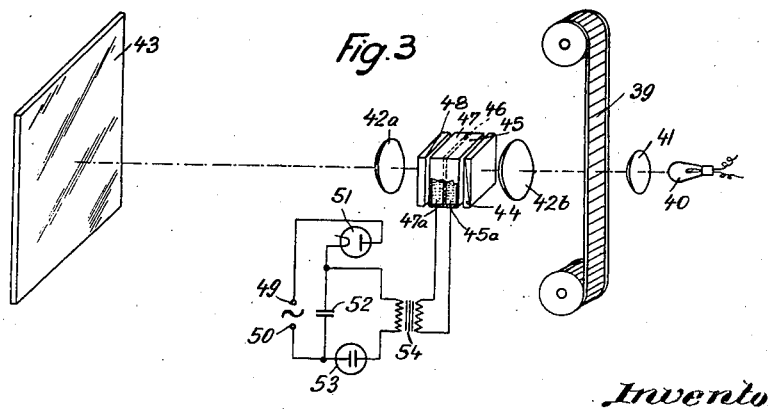
Inventor
Rudolf Levy
by [signature]
Attorney

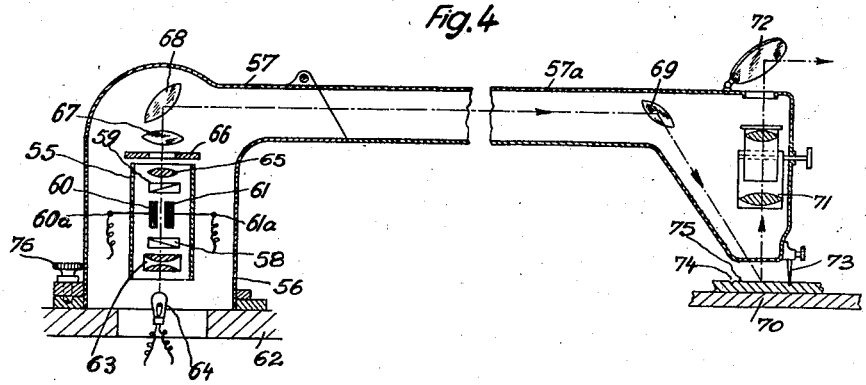
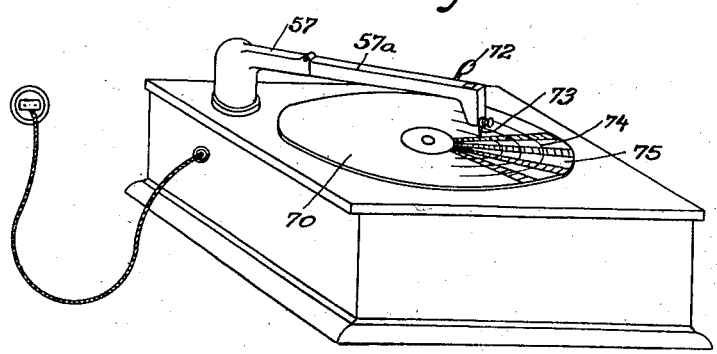

Patented May 28, 1940

2,202,458

UNITED STATES PATENT OFFICE 2,202,458

DEVICE FOR REPRODUCING CINEMATOGRAPHIC IMAGE RECORDS

Rudolf Levy, Berlin-Halensee, Germany

Application September 22, 1936, Serial No. 101,912
In Germany September 30, 1932

5 Claims. (Cl. 88—17)

The invention relates to a device for reproducing cinematographic image records by means of optical stoppage of the continuously moved series of images by instantaneously making visible the individual images.

In the known devices of this kind use is made for the step by step illumination of the continuously moving cinematographic images of a constantly burning source of light, whose light flow is caused to become active briefly through the slots of a shutter disc or drum movable with considerable speed in front of the same, particularly by rotation. In other devices of this kind continuously illuminated and continuously moved series of images are projected for short time intervals for securing the cinematographic picture effect, in that such a shutter is interposed in the course of the projection rays. The speed of movement of the shutter disc or the like is thereby controlled by direct connection with the image support driving means or also electromagnetically in dependence upon the movement of the image record carrier in correspondence with the speed of change of the image.

The duration of the individual illumination or projection light flashes, which may amount to only a very small fraction of the image interchange period, is hereby clearly dependent mainly upon the speed with which the shutter openings cut the path of the light rays which in practice resulted in the requirement that discs or drums of very great circumference had to be used. Moreover, the narrower the slit is made, the more sharply defined will the pictures be seen, but correspondingly weaker will be the light as is well known, and finally there is also a certain lower limit for the size of the shutter openings below which it is impossible to go, because then distortion effects occur at the edges of the shutter openings. Sharply defined and satisfactorily steady cinematographic images on the screen can therefore not be secured in this way.

The present invention has for its object to improve devices of this type in that for the brief interruption of the light there is interposed in the path of projection an electrically controlled light valve whereby the intensity and duration of the quantity of light at any time transmitted, with a given constantly acting light source, are dependent essentially upon the magnitude and duration of the very short electrical impulses controlling the light valve.

For closing or instantaneous opening of the light path according to the present invention, there are eminently suitable such electrical light valves which depend upon the use of the electro-optical or magneto-optical effects upon polarized light, particularly in the form of Kerr cells with electrical double refraction or Faraday cells with rotation of the plane of polarization of the light, which follow the magnitude and instantaneous value of the applied short impulses practically without inertia. According to the invention, the electrical light valve may be interposed in the illumination or also in the projection path of the rays.

The mentioned lighting-like impulses of potential or current may, in accordance with the invention, be produced by means of a condenser tripping device by impulse discharge of the condenser and also with great exactness with reference to their succession and may be brought into concidence with the image change.

The invention is, however, not to be considered as limited with respect to the manner of producing electrical impulses.

By means of the invention there may be attained at once the necessary exact starting point as well as an extremely short period of brightness between the starting and stopping of the light transmission, for avoiding the distortion and flickering of the projected cinema pictures and by using the Kerr or Faraday cells already mentioned if necessary the simultaneous sound reproduction will not be disturbed.

The invention is also especially advantageous for home cinema projectors and especially in such intended for continuously rotating disc or drum shaped image record carriers, upon which small cinema pictures in large number are recorded in adjacent series, for example spirally or circularly arranged. As a result of the special image arrangement, which in operation requires a relative shifting of the reproducer element and the image record support with respect to one another, as well as due to the necessarily small size of the image usually amounting to only a few millimeters, and also as a result of the necessary restriction in the size of the construction, in these devices particularly severe structural difficulties must be overcome for optically stopping or making stationary the continually shifting series of images.

Since with simultaneous sound and picture reproduction in home cinema devices of this type th picture receiving screen is ordinarily set up in the immediate vicinity of the producing apparatus or even structurally combined therewith, the noiselessness of a Kerr or Faraday cell for use as a light valve is particularly advantageous.

Such cinema apparatus, although because of their nature, particularly their simple manipulation and the form of the image record carrier they appealed to the public and to a great extent met the requirements and customs, were practically heretofore not capable of application. Only by the present invention has material progress been secured in order to make these cinematographic devices simple and useful and thereby open the path to their general use.

In the accompanying drawings, the invention is shown diagrammatically as based upon possible embodiment and in said drawings.

Fig. 1 is a diagram of an arrangement in accordance with the invention employing a Kerr cell and Fig. 2 one employing a Faraday cell as the light valve in the path of the illuminating rays.

Fig. 3 shows the arrangement with a light valve in the path of the projection rays.

Fig. 4 shows the arrangement in a reproducing device for disc shaped image record carriers with spirally arranged series of images and Fig. 5 is an elevation of the complete device.

In Fig. 1 the condenser 1 is charged through the resistance 4 from a direct current potential applied to the terminals 2 and 3 and is discharged through the tube 5. The discharge commences when the voltage at the condenser has attained such magnitude that the negative grid potential of the tube 5 is overcome. Simultaneously the anode current in tube 7 is stopped by the resistance 6. Thereby the negative grid potential of tube 5 returns to zero, which further speeds up the discharge. If shortly before the discharge there be applied to the tube 7 a potential impulse through the transformer 8 in such way that the tube 5 receives a positive grid potential, then the discharge phenomenon will be initiated early. This connection is already known in another art and for other purposes.

The film strip 11 is illuminated by means of a light source 12, for example an incandescent projection lamp, a metal-vapor high pressure lamp, or the like, and by an optical condenser 13. 14 and 15 are the supply and take-up reels between which the film strip is continuously moved. In the path of the illuminating light rays between the light source 12 and the film strip 11 is interposed a Kerr cell arranged as an electrically controllable light valve, consisting of the crossed Nicols 16, 17 and the plates 18, 19 of the Kerr condenser between which there is a suitable transparent medium, for example nitrobenzol or suitable crystals. There is further provided another optical condenser 20.

If alternating current whose frequency corresponds to the rate of image change of the constantly moved film strip 11, be supplied to the transformer 8 through the terminals 9 and 10 then the trip oscillation is synchronized. The discharge current, consisting of widely spaced strongly peaked impulses, is conducted through the transformer 21 to the condenser plates 18, 19 of the Kerr cell. Since the light allowed to pass through the analyzer 17 is a function of the voltage at the Kerr cell, the device may be readily so arranged that each discharge impulse causes a brief transmission of the light flux from the source of light 12.

The short light flashes thus produced illuminate the continuously moved film strip 11 whose cinematographic images may hereby be stopped or brought to a standstill by optical means and projected into space by means of the optical system 22. A normal voltage of such value may be applied to the plates of the Kerr condenser that a slight illumination normally occurs, which, however, does not suffice to illuminate the image series on the film strip 11 so strongly that they would be disturbingly visible upon the projection screen during the "dark" intervals; this initial potential would then have superimposed upon it the sudden abruptly applied electrical impulses. For eliminating undesired charges of the Kerr condenser, there may be connected in parallel therewith, if desired, an electronic or ionized discharge gap, for example a glow lamp.

Fig. 2 shows an arrangement wherein a magneto-optical light valve is used for producing the illuminating light flashes.

A condenser 26 is charged through a resistance 25, by means of a direct current or a rectified current, applied to the terminals 23 and 24, which condenser discharges through the coil 27 and the electron tube 28, when an alternating current voltage is applied to the grid 29 of the latter, through terminals 30 and 31, and synchronous with the picture change rate. The coil 27 surrounds a tube filled with carbon disulphide or a cylinder 32 made of Faraday glass. 33, 34 are polarizer and analyzer. 35 is the constantly active source of light and 36 is an optical condenser system. The two Nicol prisms 33, 34 are so adjusted with respect to one another that just no, or only little, light is transmitted therethrough. Upon each discharge of the condenser 26, through the winding 27, a current impulse of short duration flows through the same and a rotation of the plane of polarization occurs and therewith an instantaneous brightening occurs. By means of the light flashes thus produced, through the optical condenser system 36, the continuously traveling film strip 37 is briefly illuminated, its thus optically stopped individual series of pictures being projected into space by the optical system 38.

In the device just described intense magnetic fields of short duration may be produced, instead of by the electron tube 28, also in known manner by means of gas discharge lamps, for example by means of mercury vapor tubes, whose current flow is suitably controlled. For example, such a gas discharge tube may be fed at definite intervals by a condenser connected in parallel therewith, which is charged through a resistance within one picture-change interval, by impulse discharge of the condenser, whereby the trip starting of the condenser is controlled, for example through a control electrode, within or without the gas discharge lamp or by means of a thyratron. The condenser discharge may also take place for example through a mechanically controlled spark gap. It is further also possible to control both the moment of tripping of the condenser and the drive motor for the image carrier directly from the same alternating current supply system, or for example through frequency changers.

Fig. 3 shows an arrangement in accordance with the invention wherein the electrically controllable light valve is interposed in the path of the projection rays.

The series of images on the continuously moved film strip 39 are illuminated by the source of light 40 through the optical condenser 41 and projected upon the screen 43 by the optical system 42a. In the path of the projection rays is interposed the light valve, and the rays are made parallel by the optical system 42b and then pass through the polarizer 44, the transparent sheet-like alcohol or grid electrode 45, through a sheet-like layer 46 of doubly-refracting material and through a second sheet-like alcohol or grid electrode 47 as well as through the analyzer 48. The sheet-like layer 46 of doubly-refracting material may consist, for example, of a plurality of assembled crystal plates of zinc blende. The Kerr cell may also be made in the form of a sheet-like multiple plate condenser, instead of being made of the sheet-like layers 45, 46, 47, preferably in the known type of thin metal strips of alternate polarity which interengage in comb fashion and between which the doubly-refracting material is located.

Sudden electrical impuses are fed to the terminals 45a and 47a of the transparent electrodes 45 and 47, which upon suitable dimensioning and adjustment of the optical-electrical cell produce their optical opening for brief intervals, that is, permit the transmission of the light flux of the projection light source, and such sudden impulses are produced by the device hereinafter described.

The condenser 52 is charged from an alternating current source connected to the terminals 49 and 50, through a rectifier 51, and a small gas discharge lamp 53 is connected to the terminals of said condenser in series with the primary winding of a small high tension transformer 54. The gas discharge tube 53 has a definite starting voltage and a materially lower operating voltage. Upon discharge of the condenser 52 through the gas discharge tube 53 and the primary winding of the transformer 54 a voltage impulse is produced in the secondary side of the latter which is fed to the transparent sheet electrodes 45, 47 of the light valve. The discharge frequency is determined by the time of charging and may be controlled by a resistance connected in the charging circuit or by changing the cathode temperature of the rectifier tube 51, and made to agree with the rate of picture change. Of course, herewith the rate of picture change. Of course, herewith the discharge frequency of the tripping capacity 52 may also be synchronized in agreement with the movement of the picture strip 39 in another way, for example by controlling the gas discharge tube 53, say, by means of a control grid.

The short electrical impulses fed to the light valve may also be produced in another way, for example by interrupting the current on the primary side of an induction coil in synchronism with the rate of picture change, whereby on the secondary side voltage impulses are induced which act upon the light valve, or also by means of a rotating generator working on the induction principle, which is mechanically or electrically connected with the driving means of the image record carrier.

Figs. 4 and 5 show an example using the invention in a cinematographic reproducing device for disc-shaped image record carriers.

Fig. 4 shows in section a picture arm for a reproducing device such as shown in Fig. 5. The light valve 55—a Kerr cell or its equivalent—is here arranged rigidly in the vertical pivot 56 of the swinging arm 57 and has the optical condenser system 63, the polarizer 58 and the analyzer 59 as well as the condenser plates 60 and 61, between which the doubly-refracting material is located. Short voltage impulses are applied to the terminals 60a and 61a of the Kerr-cell by means of one of the above-described devices. The light valve 55 is arranged stationary within the housing 62.

The light from the source 64 which briefly traverses the Kerr cell 55 when electrical impulses are applied thereto, is concentrated by the optical system 65 upon a small window frame 66 arranged in front of the light valve 55. By means of the lens system 67, an image of the frame opening 66 is thrown upon the sheet-like image record carrier 70 through the mirror, prism, or the like 68 mounted in the vertical axis of rotation of the swinging arm 57, and a further mirror 69 from which image record the light is thrown back to the adjustable projection objective 71. This projection objective is arranged in the head of the swinging arm 57 and transmits the light to a further universally adjustable mirror 72 which throws the picture upon the projection screen. An interchangeable guide pin 73 serves for guiding on the image record support 70, the arm 57, whose forward portion 57a may be foldable upwardly, said guide pin 73 sliding in a spiral groove 74 which runs adjacent the likewise spirally arranged little images 75.

The swinging arm pivot 56 is rotatable in a guide ring and is there held by a bail, which is secured by means of a readily releasable screw 76. After releasing the screw 76 the swinging arm may be lifted off upwardly in such manner that the light valve 55 and the light source 64 are readily accessible for changing The constant source of light, the optical system and the electrical light valve may be built into a small unit and be interchangeable with respect to the latter by special securing means. A common base plate may serve as a support for the parts thus combined into a whole. This unit may, in reproducing apparatus for disc-shaped image records, be provided with spirally arranged series of images (similar to Figs. 4 and 5) and may also be arranged as an illuminating unit within the hollow swinging arm or on the head of the latter. Another possibility which serves particularly for reproduction of transparent image spiral discs would consist in arranging the illuminating unit upon the lower or upper tines of a fork which is swingably or shiftably guided above the image records upon whose second tine, opposite the illuminating unit, the optical projecting system is arranged.

Finally, it is also possible with the described unit at any time to illuminate in common an entire radial series of the individual images arranged at uniform angular spacing from one another upon the image spiral plate, whereby at any time only a single image of this series is actually used. For this purpose the light proceeding from the light valve may be concentrated upon a strip-shaped diaphragm, which in turn is projected by means of a cylindrical lens optical system, say, in the shape of a small rectangle upon a radial series of images and illuminates the latter. It is hereby also possible to use a constant light source with a longitudinally extending incandescent filament, for example a tubular incandescent lamp, a high pressure mercury vapor tube or the like, as well as a Kerr cell, with two closely adjacent oppositely arranged condenser plates, whose length dimension corresponds to the length of a radial series of images, or of the cylindrical lens. If the individual images of the cinematographic record series are associated with one another in an arcuately bent line in such manner that their utilization is made possible by means of a swinging arm, as in Fig. 5, then the tubular light source and the Kerr slot or the strip-like diaphragm may likewise be given an arcuate curvature so that the image produced by the cylindrical lens system is likewise curved and corresponds to the curvature of the radial series of images.

The receiving optical system moving in accordance with the operation in these cases is preferably provided with a diaphragm which has a length dimension of such magnitude that those images which have not yet been projected as well as those already utilized of those individual pictures in a radial series of images which are illuminated in common, are covered thereby in order that the stray light which would otherwise create a disturbance will be eliminated. In order to facilitate the setting of the optical receiving or reproducing device upon the image plate, the diaphragm or a part thereof is preferably arranged so as to be easily removable; it may, for example, be capable of being laid upon a wide ring or the like arranged around the projection objective.

The previously described embodiments constitute only several possible forms. The drawings are also throughout to be considered only as diagrammatic sketches and not as correct in scale; they are rather intended to explain only the most important considerations and several structural arrangements of the device in accordance with the invention. Important auxiliary details, which, however, are of less value in characterizing the invention, have been either entirely omitted for greater clearness or else designated merely by simplified symbols.

I claim:

1. Device for reproducing cinematographic image records, especially on disc or cylindrical record carriers, particularly for amateur cinema use, by optically stopping continuously moving series of images and thus momentarily making visible the successive individual images to be projected, said device consisting of means for constantly illuminating the images, a transparent flat plate or layer of electro-optically active material which is arranged between two polarizing sheets, two sheet-like transparent electrodes for controlling the instantaneous transmission of light of said material by means of electrical impulses of very short duration, means for producing such impulses by condenser discharges, of a frequency corresponding to the desired rate of image-change, all said sheets and electrodes being inserted in the path of the rays of the projection light between the image carrier and the projection screen.

2. Device in accordance with claim 1, wherein the electro-optically active material is a plate or layer consisting of a plurality of separate crystals of zinc blende assembled into a relatively large surface.

3. Device in accordance with claim 1, wherein the electro-optically active plate or layer consists of a flat multiple-plate electrical condenser having a doubly-refracting medium as the dielectric.

4. Device in accordance with claim 1, wherein the electro-optically active plate or layer consists of a flat multiple-plate electrical condenser having thin armatures interengaging with one another in comb-like arrangement, and having a double-refracting medium as the dielectric.

5. Device in accordance with claim 1, wherein the electro-optically active plate or layer consists of a flat multiple-plate electrical condenser having nitro-benzol as the dielectric.

RUDOLF LEVY.